United States Patent [19]  
Gengnagel

[11] 3,892,797  
[45] July 1, 1975

[54] PROCESS FOR THE PREPARATION OF 1-NITROBEN ZENE-2-CARBOXYLIC ACID ALKYL ESTER-5-CARBOXYLIC ACID AMIDES

[75] Inventor: Kurt Gengnagel, Offenbach, Main, Germany

[73] Assignee: Hoechst Aktiengesellschaft, Frankfurt am Main, Germany

[22] Filed: Mar. 27, 1974

[21] Appl. No.: 455,375

[30] Foreign Application Priority Data  
Apr. 3, 1973   Germany............................ 2316459

[52] U.S. Cl.............................. 260/471 R; 260/471  
[51] Int. Cl........................................... C07c 103/24  
[58] Field of Search ................................ 260/471 R

[56]     References Cited  
OTHER PUBLICATIONS  
Royals, E. E., Advanced Organic Chemistry, (1961), pub. by Prentice–Hall, Inc. Englewood Cliffs N.J. (QD251R68C–6) pp. 616 and 617 cited.

Primary Examiner—Lorraine A. Weinberger  
Assistant Examiner—L. A. Thaxton  
Attorney, Agent, or Firm—Connolly and Hutz

[57] ABSTRACT

A process for the preparation of 1-nitrobenzene-2-carboxylic acid alkyl ester-5-carboxylic acid amides, wherein 1-nitro-benzene-2,5-dicarboxylic acid dialkyl esters are reacted with ammonia in a polar organic solvent miscible with water in which the final product is obtained in a very good yield and in a very easily conducted process wherein only one reaction step must be carried out.

1 Claim, No Drawings

PROCESS FOR THE PREPARATION OF 1-NITROBENZENE-2-CARBOXYLIC ACID ALKYL ESTER-5-CARBOXYLIC ACID AMIDES

The present invention relates to an improved process for the preparation of 1-nitrobenzene-2-carboxylic acid alkyl ester-5-carboxylic acid amides.

1-Nitrobenzene-2-carboxylic acid alkyl ester-5-carboxylic acid amides are starting materials for valuable azo pigments. They can be prepared by saponifying 1-nitrobenzene-2,5-dicarboxylic acid dialkyl esters to form 1-nitrobenzene-2-carboxylic acid alkyl ester-5-carboxylic acids, by converting these ones into 1-nitrobenzene-2-carboxylic acid alkylester-5-carboxylic acid chlorides and subsequently reacting with ammonia to 1-nitrobenzene-2-carboxylic acid alkyl ester-5-carboxylic acid amides (cf. German Patent Specification No. 1,199,905).

This process has the disadvantage that it proceeds in several steps and thus, demands a considerable expenditure in equipment. Furthermore, this multiple-stage process is accompanied by a loss of yield.

It has now been found that a 1-nitrobenzene-2carboxylic acid alkylester-5carboxylic acid amide preferably the alkylester containing an alkyl group of 1,2,3 or 4 C-atoms, can be prepared more easily and with a better yield if a 1-nitrobenzene-2,5-dicarboxylic acid dialkyl ester is reacted with ammonia in a polar, water-miscible organic solvent.

The process of the invention is carried out by treating a 1-nitro-2,5-dicarboxylic acid dialkyl ester, for example a methyl, ethyl, propyl or butyl ester, with a solution of ammonia in a polar, water-miscible organic solvent which contains about 10 to 20 %, preferably about 15 % by weight of ammonia, at about 20°–30°C.

As polar organic solvents miscible with water there are suitable for example lower aliphatic alcohols such as methanol, ethanol, iso- or n-propanol, butanol, acetone, dioxane, methylethyl ketone, dimethylformamide, aceto-nitrile, dimethylsulfoxyde, N-methylpyrrolidone or ethylene-glycol-monomethyl ether.

In the process of the invention it is surprising that only the carboxylic acid ester group being in 5-position is amidated, whereas the carboxylic acid ester group being in 2-position remains unchanged.

The 1-nitrobenzene-2-carboxylic acid alkyl ester-5-carboxylic acid amides obtained according to the invention can be used as starting compounds for further reactions: For example, the nitro group may be reduced to the amino group or the carboxylic acid amide group may be converted into the amino group by Hofmann degradation or by dehydratization into the nitrile group which are suitable and well-known starting compounds for the preparation of dyestuffs and pigments.

The following Example illustrates the process of the invention. Parts are by weight.

EXAMPLE

400 Parts of 1-nitrobenzene-2,5-dicarboxylic acid dimethyl ester were introduced at about 5° to 10°C into 800 parts of a 15 % methanolic ammonia solution. Then the mixture was stirred for about 25 hours at 20°–25°C, mixed with 2500 parts by volume of cold water, the deposit was suction-filtered, washed and dried. 320 Parts of 1-nitrobenzene-2-carboxylic acid methyl ester-5-carboxylic acid amide = 85.5 % of the theory having a melting point of 167°–170°C was obtained.

If in the above Example instead of 1-nitrobenzene-2,5-dicarboxylic acid dimethyl ester the corresponding diethyl ester and an ethanolic ammonia solution was used, the 1-nitrobenzene-2-carboxylic acid ethyl ester-5-carboxylic acid amide was obtained with a yield of 82 % of the theory.

I claim:

1. A process for the preparation of a 1-nitrobenzene-2-carboxylic acid alkyl ester-5-carboxylic acid amide, wherein a 1-nitrobenzene-2,5-dicarboxylic acid dialkyl ester is reacted with ammonia in an alcoholic ammonia solution at about 20° to 30°C.

* * * * *